United States Patent
Quintana et al.

(10) Patent No.: US 9,024,229 B2
(45) Date of Patent: May 5, 2015

(54) METHOD FOR OPTIMIZING WELD PERFORMANCE

(75) Inventors: Marie A. Quintana, Twinsburg, OH (US); Vaidyanath B. Rajan, Mentor, OH (US); Joe Daniel, Sagamore Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 702 days.

(21) Appl. No.: 13/250,420

(22) Filed: Sep. 30, 2011

(65) Prior Publication Data

US 2013/0082039 A1 Apr. 4, 2013

(51) Int. Cl.
*B23K 9/00* (2006.01)
*B23K 31/12* (2006.01)

(52) U.S. Cl.
CPC ................................. *B23K 31/12* (2013.01)

(58) Field of Classification Search
USPC .............................................. 219/125.1–126
See application file for complete search history.

(56) References Cited

U.S. PATENT DOCUMENTS

| | | | | |
|---|---|---|---|---|
| 5,080,732 | A * | 1/1992 | Lacy et al. | 148/508 |
| 8,309,886 | B2 * | 11/2012 | Ihara et al. | 219/130.5 |
| 8,546,728 | B2 * | 10/2013 | Sickels | 219/137.71 |
| 8,592,723 | B2 * | 11/2013 | Davidson et al. | 219/130.5 |
| 2007/0095878 | A1 * | 5/2007 | Scott et al. | 228/102 |

* cited by examiner

*Primary Examiner* — Sang Y Paik
(74) *Attorney, Agent, or Firm* — Pearne & Gordon LLP

(57) ABSTRACT

The method of optimizing performance of a weld includes determining a set of specified mechanical properties, such as hardness or toughness for the weld, selecting a base metal material, selecting a welding process and welding process conditions, and selecting a weld metal material. The weld metal material and/or the base metal material may be selected by determining a characterization of the weld or base metal material, the characterization including performing a thermal-mechanical simulation of the metal materials and determining the properties of the metals produced by the thermal-mechanical simulation, and subsequently correlating the characterization of the metal materials with the set of specified mechanical properties and the welding process conditions. The method may also include producing said weld having said set of mechanical properties.

13 Claims, 10 Drawing Sheets

METHOD FOR OPTIMIZING WELD PERFORMANCE

This invention was made with government support under Agreement No. DTPH56-07-T-000005 awarded by the U.S. Department of Transportation, PHMSA. The Government may have certain rights to this invention.

FIELD OF THE INVENTION

This disclosure relates in general to an analytical method for optimizing the weld quality and performance. Specifically, the method includes consideration of how the composition of the base metal material, the composition of the weld metal material, and the welding process interact and how that interaction affects the performance of the weld produced.

BACKGROUND

Industries that demand high levels of performance from welded steel fabrications (e.g. high pressure gas pipelines) find that as steel grades increase, it is more challenging to achieve welds of required levels and consistency of strength and toughness due to the greater performance variation with seemingly small changes in welding process conditions. A major technological challenge is achieving the necessary weld properties with sufficient reliability and consistency to ensure weld performance using a broad enough range of welding processes for the existing production conditions and contractor capabilities.

Simple transfer of technologies from previously used lower grade materials it not likely to achieve the desired weld performance for new higher grade steels and the alteration of the methods used to optimize the weld qualities for use with new materials has been an endeavor in trial and error. A method for achieving the necessary level of control over essential welding variables, such as welding consumable design, weld joint dimensions, welding power source and setup, and welding torch configuration, in new welding applications is needed.

SUMMARY OF THE INVENTION

The method of optimizing performance of a weld includes determining a set of specified mechanical properties, such as hardness or toughness for the weld, selecting a base metal material, selecting a welding process and welding process conditions, and selecting a weld metal material. The weld metal material and/or the base metal material may be selected by determining a characterization of the weld or base metal material, the characterization including performing a thermal-mechanical simulation of the metal materials, and determining the properties of the metals produced by the thermal-mechanical simulation and subsequently correlating the characterization of the metal materials with the set of specified mechanical properties and the welding process conditions. The method may also include producing said weld having said set of mechanical properties.

DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
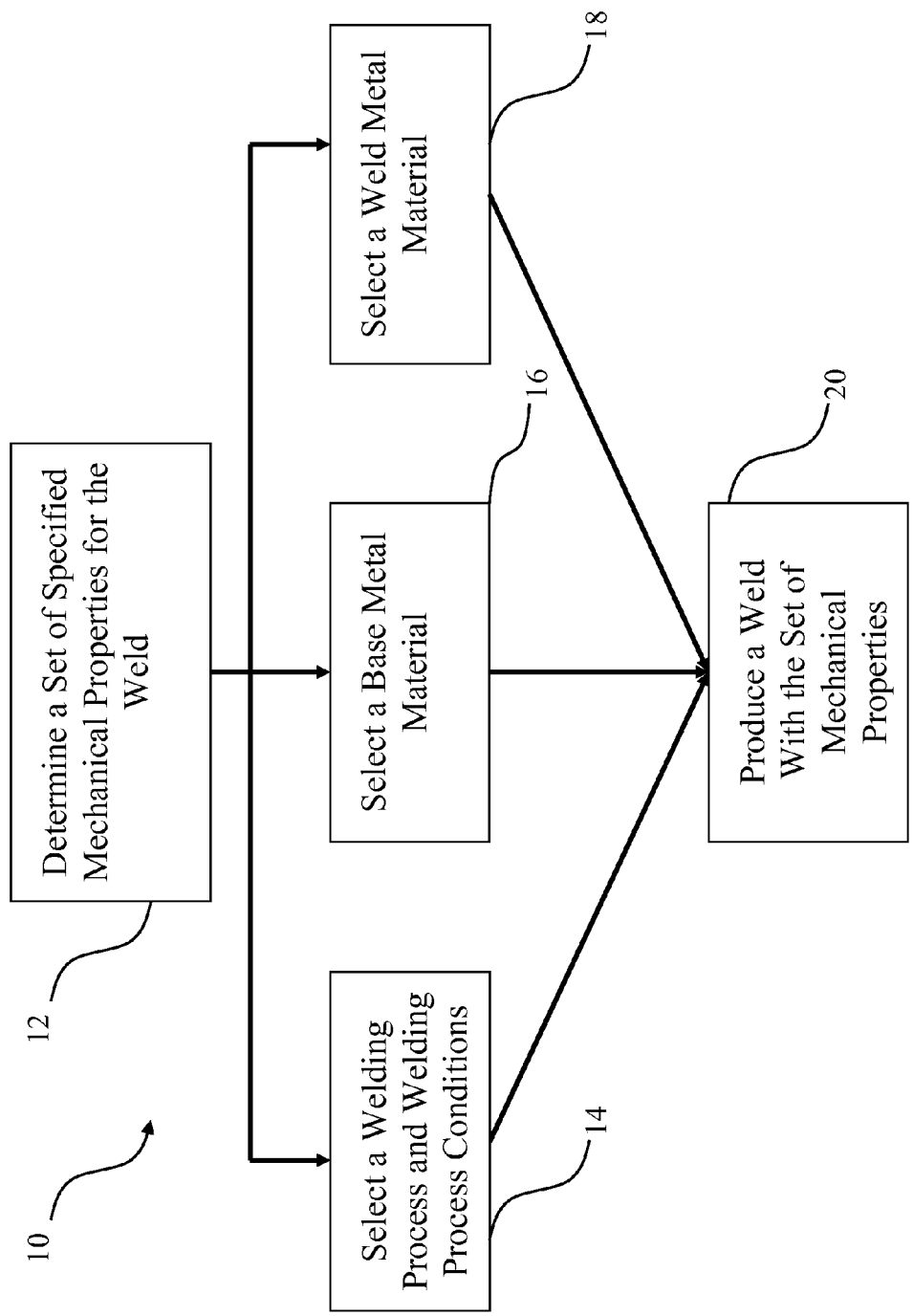
FIG. 1 is a schematic representation of a method of optimizing weld qualities.

There is sufficient interaction between the welding process and the material chemical compositions (of both the base metal material and weld metal material) that the control of both of these inputs is necessary to optimize the weld qualities desired for demanding applications, for example, strain based design of steel pipeline fabrication. As shown in FIG. 1, a method of producing a weld with optimal weld qualities 10 includes determining a set of specified mechanical properties for a weld 12, selecting a welding process and welding process conditions 14, selecting a base metal material 16, and selecting a weld metal material 18. The method 10 may also include the step of producing a weld having the specified set of mechanical characteristics 20. It should be appreciated that the method of producing a weld with optimal weld qualities 10 may be used to optimize the weld qualities resulting from the use of any combination of suitable base metal materials, welding processes, and weld metal materials.

Obtaining optimal mechanical properties for a resulting weld, which will generally include the combination of the HAZ of the base metal material and the weld metal material, will generally optimize the performance of a weld metal material when applied to a particular base metal material. The step of determining the set of specified mechanical properties for the weld 12 is one of the primary determinations to be made in the method 10. The step of determining a set of specified mechanical properties for the weld 12 includes selecting the mechanical properties, such as, but not limited to, the hardness, toughness, strength, and ductility of the resulting weld that would yield the optimal performance for the weld strength and reliability. The selection of the mechanical properties will be predetermined based on the demands of the welding application, generally from a project engineer or other such qualified source.

After the set of mechanical properties for the weld has been determined 12, the weld itself may be optimized by selecting an appropriate welding process and welding process conditions 14, selecting an appropriate base metal material 16, and selecting an appropriate weld metal material 18. One or more of these variables may be fixed, as shown in FIGS. 2-3, requiring alteration of one or both of the other variables to produce a weld with the set of specified mechanical properties 20.

Figure 2:
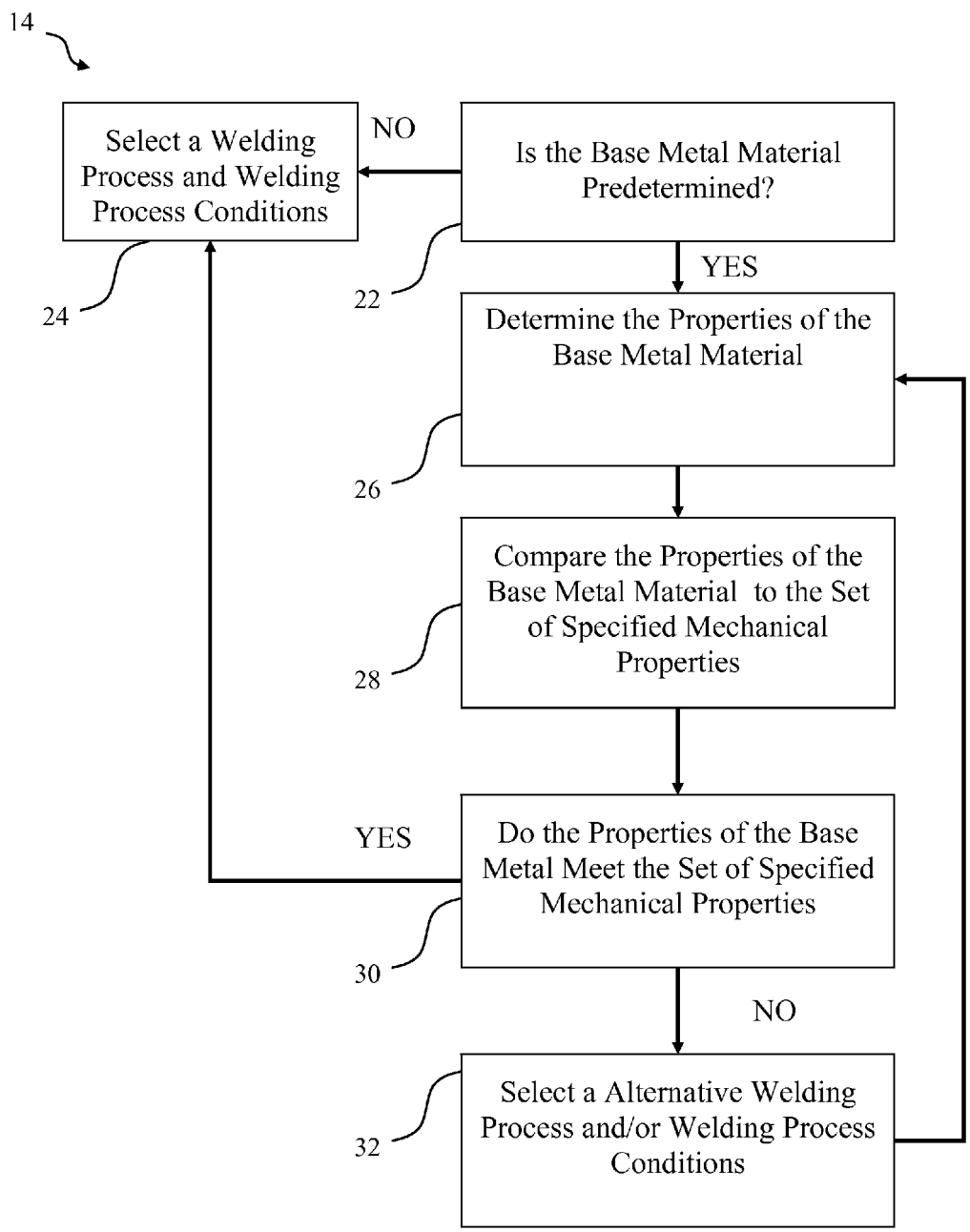
FIG. 2 is a schematic representation of a method of selecting a welding process.
Figure 3:
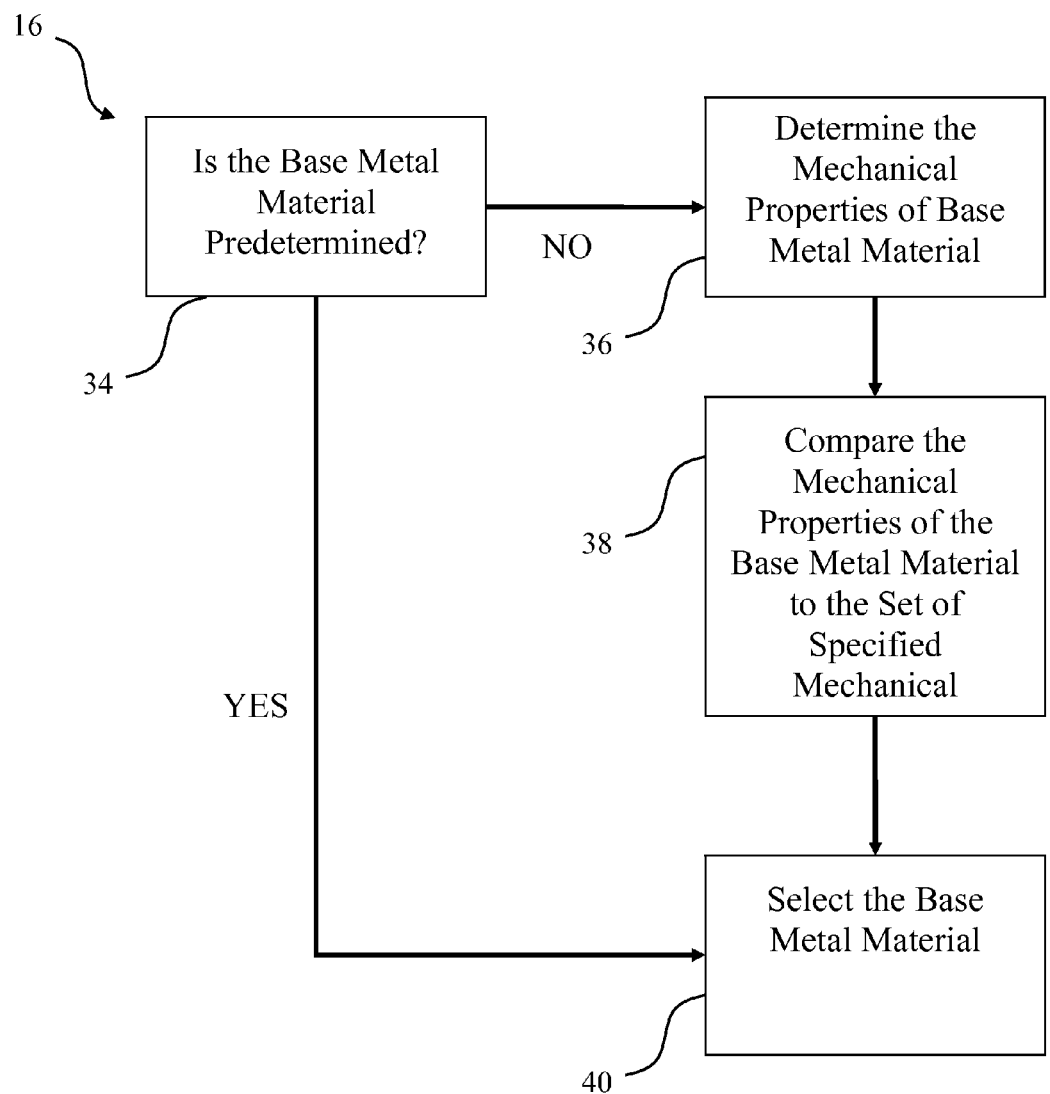
FIG. 3 is a schematic representation of a method of selecting base metal material.

For example, as shown in FIG. 2, when selecting a welding process and welding process conditions 14, it is necessary to determine if the base metal material has already been chosen, or is predetermined, for use in a welding application 22. If not, a welding process and welding process conditions may be chosen 24 based on user preference and consideration of the properties of the weld metal material, as discussed below.

If the base metal material has already been chosen, the properties, such as hardness and toughness, of the HAZ of the base metal material produced by a desired welding process and welding process conditions must be determined 26, as discussed below, and compared to the set of specified mechanical properties 30. If the mechanical properties of the HAZ of the base metal material meet the set of specified mechanical properties, the desired welding process may be selected 24. However, if the mechanical properties of the HAZ of the base metal material do not meet the specified mechanical properties using the desired welding process, the welding process and/or the welding process conditions may need to be altered 32. After altering the welding process and/or the welding process conditions, it is necessary to again determine the properties of the base metal material 26 produced using the new welding process and/or welding process conditions.

Generally, the cooling rates, and consequently the properties, of the HAZ of the base metal material are determined by the welding process for a given material being welded (the weld metal material or the base metal material). Should the cooling rates (and the mechanical properties) associated with a particular welding process need to be adjusted, the welding process or the welding process conditions can be changed. It should be noted that the cooling rate for a particular process can be described as a rate in degrees per unit time or as a time to cool from one temperature to another. For the purpose of this application, the cooling rates described the time taken for a material to cool from one temperature to another.

The welding process may be gas metal arc welding or any other suitable welding process for the application. The welding process may be altered by changing the welding power-source type/model, for example, from a dual torch weld to a single torch weld. The welding process may also be altered by changing welding process conditions, such as the contact tip to work distance, pulse mode, wave form details, voltage, current, wire feed speed, travel speed, preheat temperature, interpass temperature, shielding gas types, and shielding gas flow rate of the welding process, which will ultimately change the cooling rate range for the given welding process and welding process conditions.

The cooling rate of a welding process with given welding process conditions can be calculated using the TRUE HEAT INPUT, as described in U.S. Patent Application Nos. 2009/0184098, 2007/0262064, and 2010/00065539 to Daniel et al., the disclosures of which are incorporated herein by reference. By using TRUE HEAT INPUT to accurately determine the influence of the welding process, an accurate cooling rate range for the welding process may be calculated. Alternatively, the cooling rates for various processes may be determined manually by, for example, inserting thermocouples into test weld metal materials or test HAZs of a base metal materials. Any technique known in the art for calculating, either with a computer program or manually, the cooling rates of a specific welding process could be used with the method disclosed.

As shown in FIG. 3, the step of selecting a base metal material 16 includes determining if the base metal material has been predetermined 34. If so, the base metal material may be selected as discussed above with reference to FIG. 2. If the base metal material has not been predetermined, the base metal material must be characterized and the mechanical properties of the base metal material determined 36.

The characterization of the HAZ of the base metal material and subsequent determination of its mechanical properties 36 may include, for example, using a thermal mechanical simulator, such as the Gleeble® 2000 and Gleeble® 3800 systems, to conduct thermal simulations of the base metal material, transforming the base metal material (or weld metal material, as discussed below) from a starting state to a second state by simulating the heating and cooling of the material that would happen were it to be subjected the given welding process and welding process conditions.

Once the base metal material has been subjected to the thermal mechanical simulator, a CCT phase diagram of the base metal material may be generated. The CCT phase diagrams show microstructure changes in the HAZ of the base metal material produced by a specific welding process that occurs as the base metal material cools. Generally, CCT phase diagrams may be calculated using any method known to those of skill in the art and may be available from the manufacturer of the base metal material.

The CCT diagram may be enhanced by measuring other mechanical properties of the HAZ, as a function of the cooling rate. Toughness, hardness, strength, and ductility of the HAZ, among other properties, may be measured using known techniques, such as the Vickers hardness test or the Charpy V notch toughness test. These measurements may then be plotted as a function of the cooling rates for the selected process and the microstructures formed in the HAZ.

Once the mechanical properties of the HAZ of the base metal materials have been determined 36 for a given range of cooling rates, they are then compared (or correlated) to the set of specified mechanical properties and the welding process conditions 38 and if the mechanical properties of the HAZ of the base metal material and the set of specified mechanical properties match, the base metal material may be selected 40.

Figure 4:
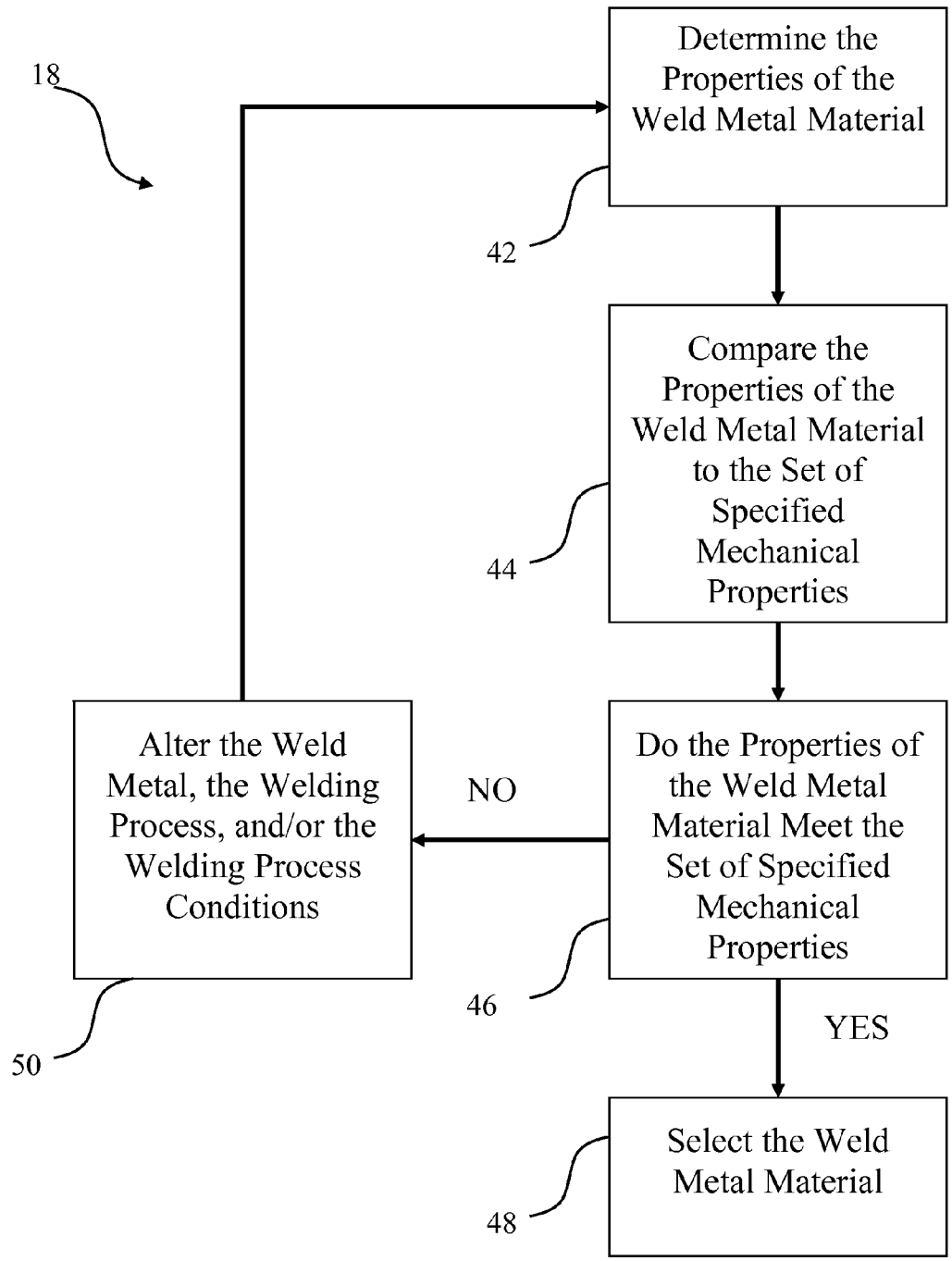
FIG. 4 is a schematic representation of a method of selection a weld metal material.

As shown in FIG. 4, the step of selecting a weld metal material 18 includes characterizing and subsequently determining the properties of the weld metal material 42. The properties of the weld metal may be determined by, for example, transforming the weld metal material from a first state to a second state, as discussed above with regard to the base metal material, using a thermal mechanical simulator, and producing a CCT phase diagram of the weld metal material. The CCT phase diagram may be produced by a computer software program or may be plotted manually given the information about the microstructures formed that have been gleaned during the thermal mechanical simulation. The CCT phase diagrams show microstructure changes in the weld metal material produced by a specific welding process that occur as the weld metal material cools.

The weld metal material CCT diagram may be enhanced by measuring other mechanical properties of the cooled weld metal, as a function of the cooling rate. Toughness, hardness, strength, and ductility of the weld metal, among other properties, may be measured using known techniques, such as the Vickers hardness test or the Charpy V notch toughness test. These measurements may then be plotted as a function of time against the cooling rates for the selected process and the microstructures formed in the weld metal material.

Once the mechanical properties of the weld metal materials have been determined 42, they are compared (or correlated) to the set of specified mechanical properties and the welding process conditions 44. If the properties of the weld metal material and the set of specified mechanical properties match 46, the weld metal material may be selected 48. If the properties of weld metal produced by a given welding process and welding process conditions do not meet the set of specified mechanical properties, it is necessary to choose a new weld metal material, a new welding process, a new set of welding process procedures, or a combination thereof 50.

Upon altering the weld metal material, the welding process, and/or the welding process conditions, it is necessary to again determine the properties of the weld metal material 42 and compare the weld metal properties obtained using the new inputs with the set of specified mechanical properties 44 to determine if they are met 46. This process may be repeated until a desirable combination of variables is achieved.

Hypothetical Examples

FIGS. 5-10 show enhanced CCT phase diagrams of base metal materials A-C and weld metal materials D-F, respectively. The enhanced CCT phase diagrams are a result of applying welding process X and welding conditions Y to the various metal materials. As shown in FIGS. 5-10, the CCT phase diagrams define the different metallic microstructures formed as a result of subjecting the metal materials to welding process X and welding process conditions Y as a function of time. The metallic microstructures shown in FIGS. 5-10 include martensitic (M), bainite (B), granular bainite (GB), ferrite sideplates (FS), acicular ferrite (AF), and grain boundary ferrite (GF) microstructures.

FIGS. 5-10 also include a correlation of the calculated cooling rates associated with welding process X and the measured hardness values for the cooled heat affected zone (HAZ) of the base metal materials and the cooled weld metal materials that will be produced with welding process X and welding process conditions Y as a function of cooling rate, indicated by a shorter cooling time.

The Vickers hardness test indicates the questioned base or weld metal material's ability to resist plastic deformation from a standard source. The Vickers hardness number is determined by calculating the load over the surface area of an indentation created in the material. The $H_v$ number is determined by the ratio F/A where F is the force applied to the diamond-shaped impression in kilograms-force and A is the surface area of the resulting indentation in square millimeters. The corresponding units of $H_v$ are kilograms-force per square millimeter ($kgf/mm^2$). It should be appreciated that any method of calculating the hardness of the metal material at different cooling rates could be used in this method.

As shown in FIGS. 5-10, the enhanced CCT diagrams may be used to determine what base metal material, welding process, and weld metal material should be used for a given project to produce a required set of mechanical properties. In this example, the resulting hardness of the HAZ of the base metal material and of the weld metal material must be at least 340 $H_v$ for the resulting weld to stand up to the strain of the final application, for example, use in a pipeline project. The customer has also specified that they intend to use welding process X and welding conditions Y, which under standard welding process conditions produces a cooling rate range of approximately 2-4 seconds. The base metal material and the weld metal material must be selected to produce a weld that meets the requirements.

In order to select a base metal material, each base metal material must be characterized, as described above, by producing an enhanced CCT diagram. It must then be determined if the hardness produced at a cooling rate of between 2-4 seconds will meet the customer's requirement.

Figure 5:
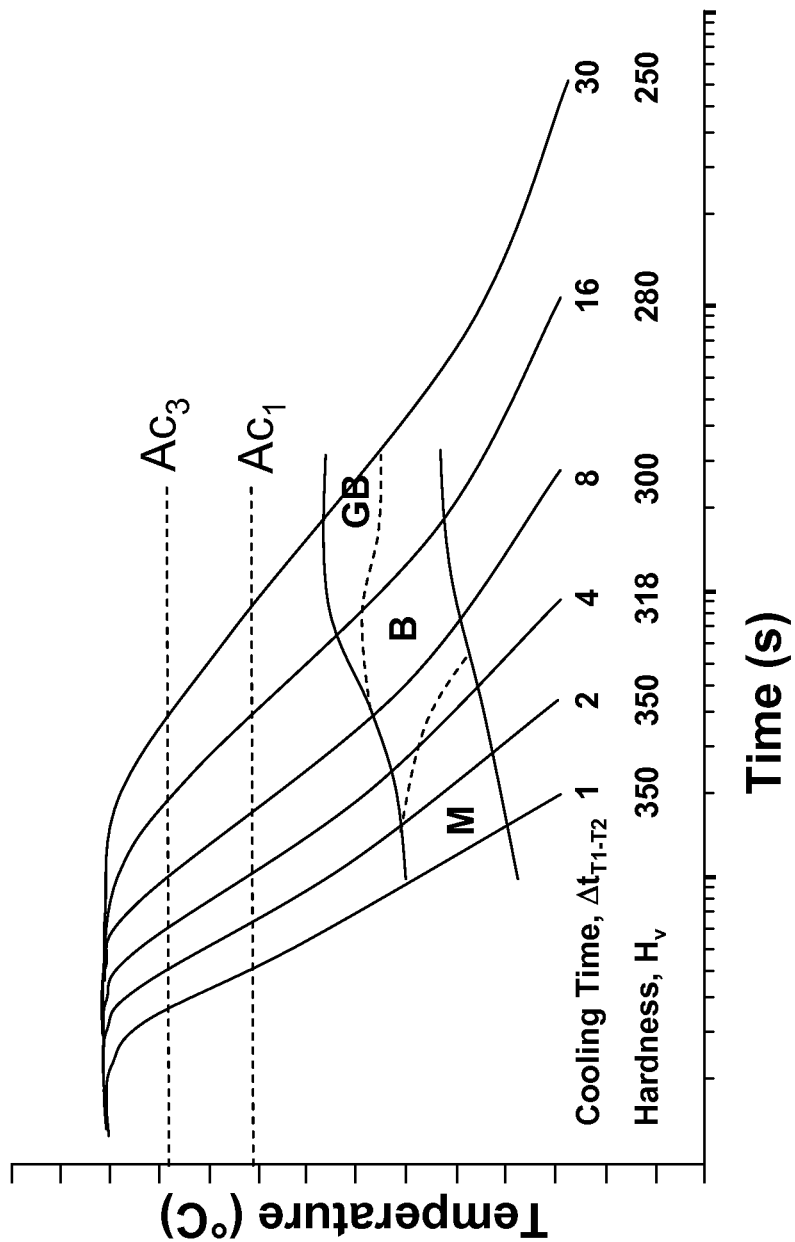
FIG. 5 is an enhanced continuous cooling transformation (CCT) phase diagram of base metal material A.

As shown FIG. 5, base metal material A has a hardness greater than 380 $H_v$ when the cooling rate is less than approximately 3 seconds, but is less than 340 $H_v$ at 4 seconds. Therefore, if in practice the cooling rate produced by the welding process is 4 seconds, the required hardness of the HAZ of the base metal material would not be achieved by using base metal material A. Therefore, base metal material A would not be an appropriate choice for this welding project unless the welding process and/or welding process conditions were altered.

Figure 6:
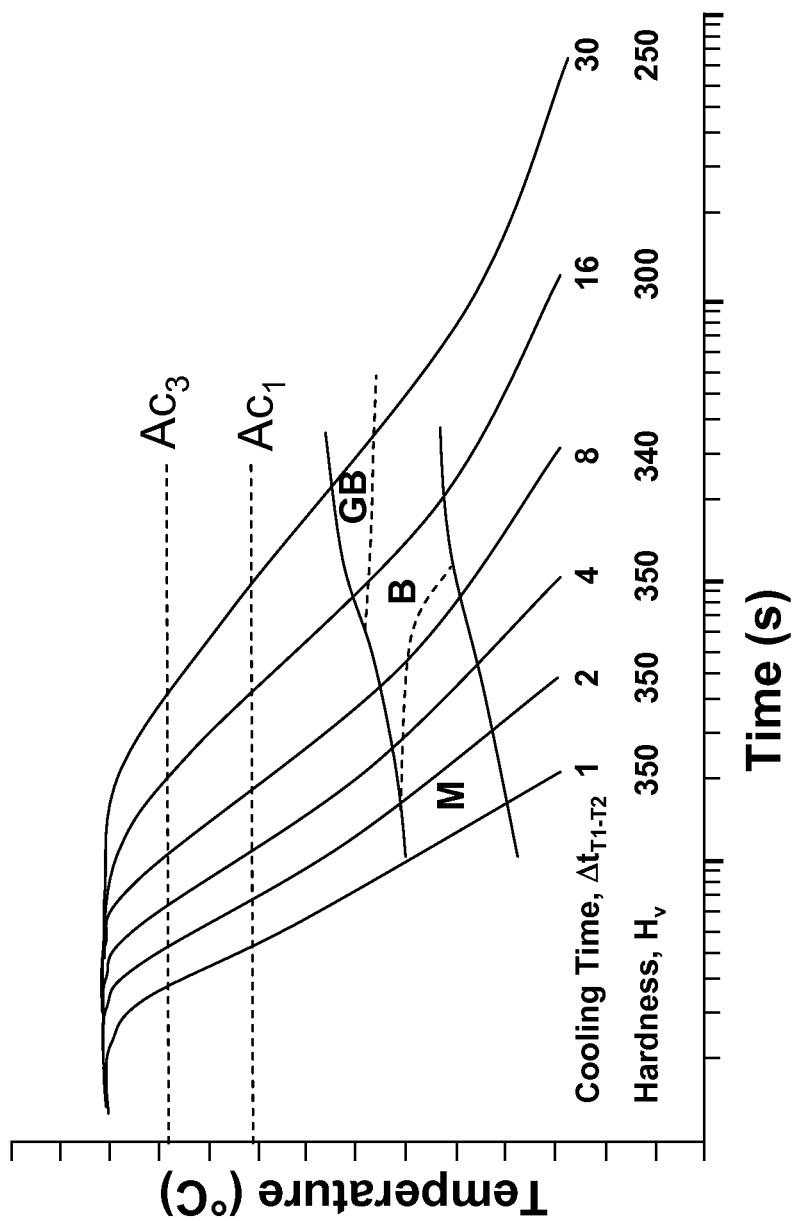
FIG. 6 is an enhanced CCT phase diagram of base metal material B.
Figure 7:
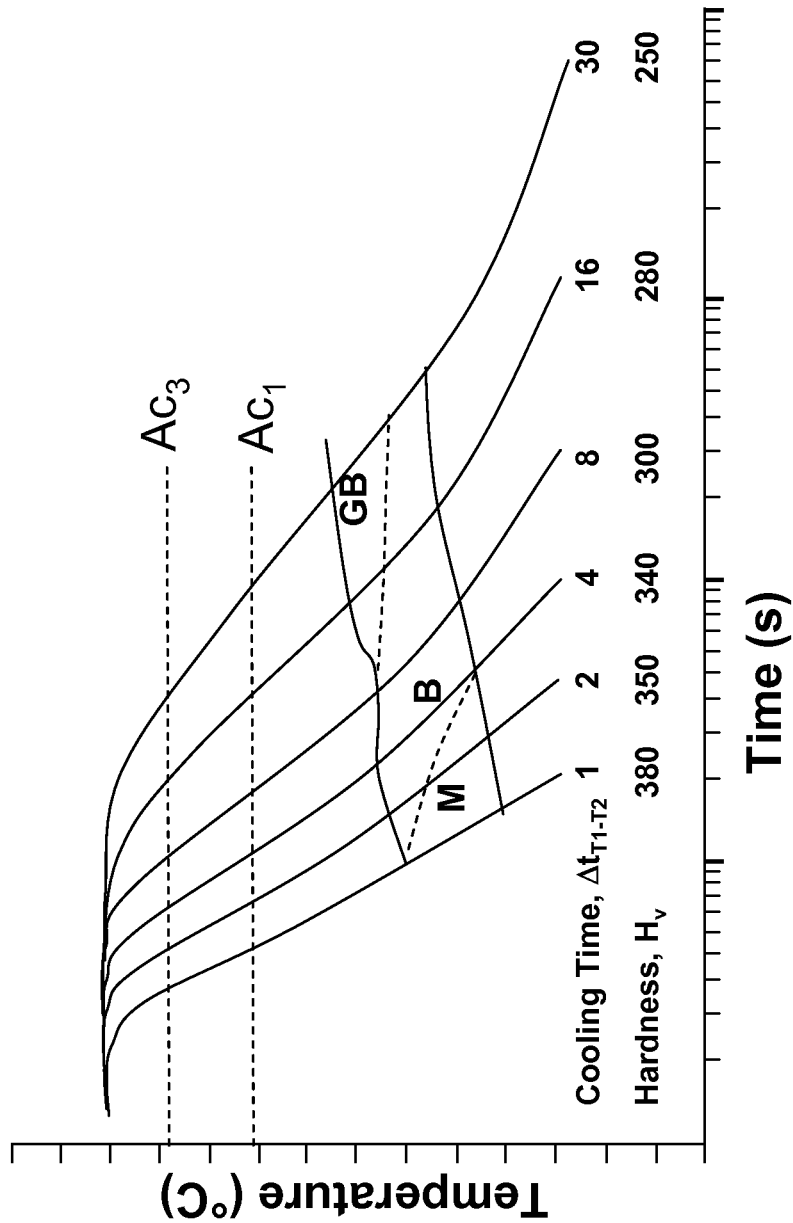
FIG. 7 is an enhanced CCT phase diagram of base metal material C.
Figure 8:
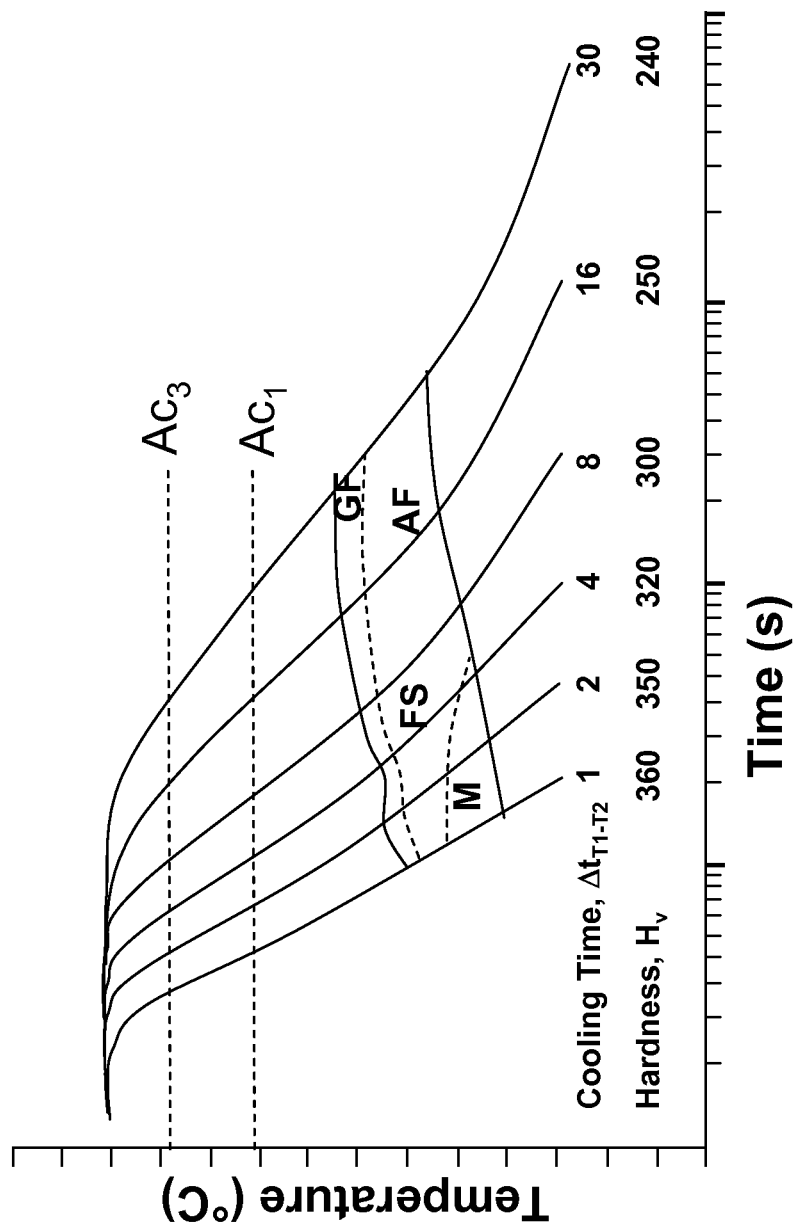
FIG. 8 is an enhanced CCT phase diagram of weld metal material D.
Figure 9:
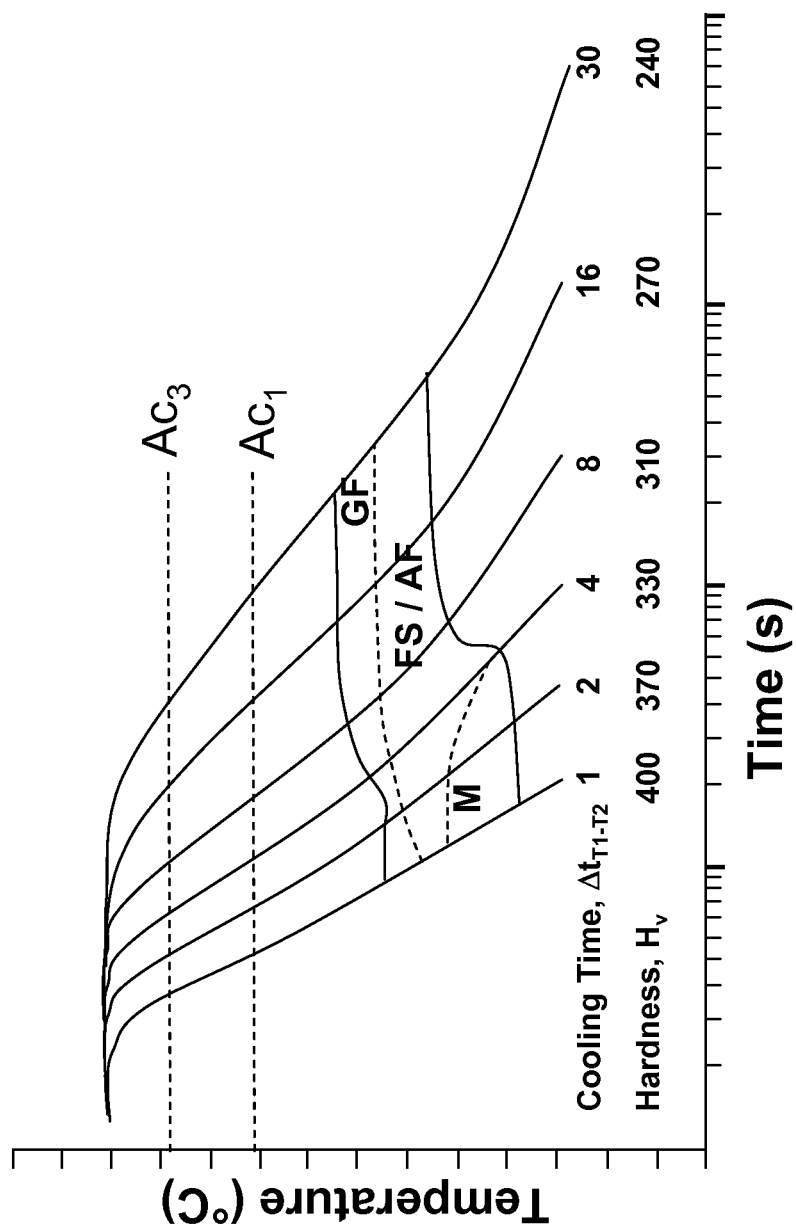
FIG. 9 is an enhanced CCT phase diagram of weld metal material E.

FIGS. 6-7, for base metal materials B and C, however, show that the hardness values produced at cooling rates of between 2-4 seconds meet the customer's requirement of a hardness in the HAZ of at least 340 $H_v$. Therefore, it would be appropriate to choose base metal materials B or C.

In order to select a weld metal material, each weld metal material will need to be characterized, as described above, by producing an enhanced CCT diagram, if one is not already available for the weld metal material. It must then be determined if the hardness produced at a cooling rate of between 2-4 seconds will meet the customer's requirements. As shown FIGS. 8 and 9, weld metal materials D and E have a hardness of approximately 340 $H_v$ when the cooling rate is less than approximately 3 seconds. Therefore, if the cooling rate produced by welding process X and welding process conditions Y is 4 seconds, the required hardness is not achievable by using weld metal materials D or E. Therefore, weld metal materials D and E are not appropriate choices for this welding project unless the welding process and/or welding process conditions are altered.

Figure 10:
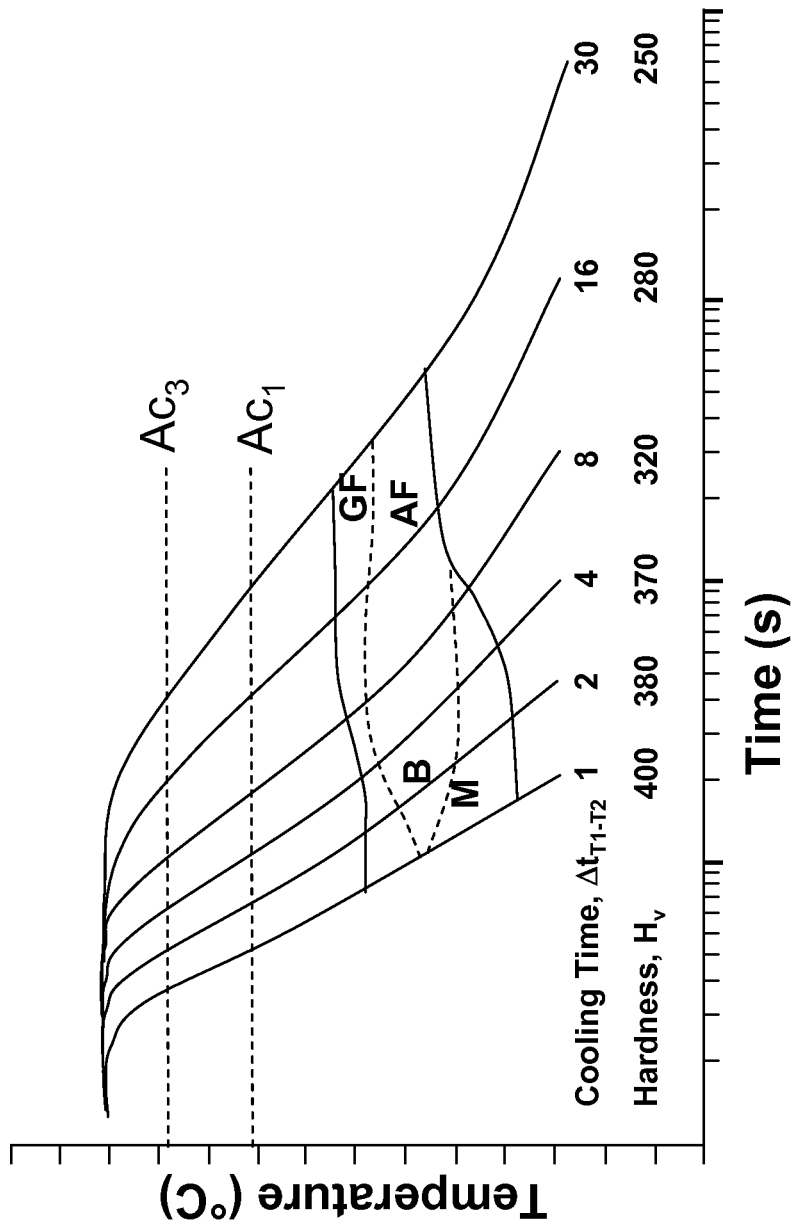
FIG. 10 is an enhanced CCT phase diagram of weld metal material F.

FIG. 10, for weld metal material F, however, show that the hardness values produced by cooling rates of between 2-4 seconds meet the customer's requirement of at least 340 $H_v$. Therefore, it would be appropriate to choose weld metal material F for this project.

It should be noted that if base metal A or weld metals D and E were already chosen for the project, the welding process and/or welding process conditions may be altered to achieve a cooling rate range that would produce the set of specified mechanical properties dictated by the customer. The welding process and welding process conditions may be altered as discussed above.

While methods and compositions have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details and the illustrative examples shown and described. Thus, this application is intended to embrace alterations, modifications, and variations that fall within the scope of the appended claims. Furthermore, the preceding description is not meant to limit the scope of the invention. Rather the scope of the invention is to be determined by the appended claims and their equivalents.

The invention claimed is:

1. A method of optimizing performance of a weld, comprising:
   determining a set of specified mechanical properties for a weld;
   selecting a base metal material;
   selecting a welding process;
   selecting welding process conditions;
   selecting a weld metal material, wherein said weld metal material is selected by:
      determining a characterization of said weld metal material, wherein said characterization comprises performing a thermal-mechanical simulation of said weld metal material and determining properties of said weld metal material produced by said thermal-mechanical simulation, wherein determining said characterization of said weld metal material includes generating an enhanced continuous cooling transformation (CCT) phase diagram for said weld metal material, the enhanced CCT phase diagram comprising both of:
(a) a CCT phase diagram, for said weld metal material, that includes a plurality of different cooling rates of said weld metal material, and
(b) respective mechanical property values of said weld metal material corresponding to each of said plurality of different cooling rates, wherein the respective mechanical property values include at least one of hardness values, toughness values, strength values and ductility values of said weld metal material; and correlating said characterization of said weld metal material with said set of specified mechanical properties, including comparing said respective mechanical property values from the enhanced CCT phase diagram for said weld metal material to said set of specified mechanical properties; and applying the weld material to the base metal material to produce the weld having said set of specified mechanical properties.

2. The method of claim 1, wherein said characterization of said weld metal comprises the use of a computer program.

3. The method of claim 1, wherein said step of selecting said welding process conditions comprises a range of cooling rates for said welding process, a torch distance for said welding process, a torch configuration for said welding process, a wave form for said welding process, a heat input, or a combination thereof.

4. The method of claim 1, wherein said set of specified mechanical properties of said weld are selected from the group comprising hardness, toughness, strength, ductility, or a combination thereof.

5. The method of claim 1, wherein said properties of said weld metal material produced by said thermal-mechanical simulation comprise a microstructure composition, a hardness, a toughness, a strength, a ductility, or a combination thereof, of said weld metal material as a function of time.

6. The method of claim 1, wherein said step of selecting a base metal material comprises determining a characterization of a heat affected zone of said base metal material, wherein said characterization comprises performing a thermal-mechanical simulation and correlating said characterization of said heat affected zone of said base metal material with said set of specified mechanical properties for said weld.

7. The method of claim 6, wherein said characterization of said heat affected zone of said base metal material further comprises determining properties of said heat affected zone of said base metal material produced by said thermal-mechanical simulation.

8. The method of claim 7, wherein said properties of said heat affected zone of said base metal material produced by said thermal-mechanical simulation comprise a microstructure composition, a hardness, a toughness, a strength, a ductility, or a combination thereof, of said heat affected zone as a function of cooling rate.

9. The method of claim 8, wherein said step of selecting said base metal material comprises comparing said properties of said base metal material produced by said thermal-mechanical simulation to said set of specified mechanical properties.

10. A method of optimizing performance of a weld, comprising:
determining a set of specified mechanical properties for a weld;
selecting a welding process;
selecting welding process conditions for said welding process;
selecting a base metal material, wherein said base metal material is selected by:
determining a characterization of a heat affected zone of said base metal material, wherein said characterization comprises performing a thermal-mechanical simulation of said base metal material; and
correlating said characterization of heat affected zone of said base metal material with said set of specified mechanical properties for said weld;
selecting a weld metal material, wherein said weld metal material is selected by:
determining a characterization of said weld metal material, wherein said characterization comprises performing a thermal-mechanical simulation of said weld metal material and determining properties of said weld metal material produced by said thermal-mechanical simulation, wherein determining said characterization of said weld metal material includes generating an enhanced continuous cooling transformation (CCT) phase diagram for said weld metal material, the enhanced CCT phase diagram comprising both of:
(a) a CCT phase diagram, for said weld metal material, that includes a plurality of different cooling rates of said weld metal material, and
(b) respective mechanical property values of said weld metal material corresponding to each of said plurality of different cooling rates wherein the respective mechanical property values include at least one of hardness values, toughness values, strength values and ductility values of said weld metal material; and
correlating said characterization of said weld metal material with said set of specified mechanical properties, including comparing said respective mechanical property values from the enhanced CCT phase diagram for said weld metal material to said set of specified mechanical properties; and
applying the weld metal material to the base metal material to produce the weld.

11. The method of claim 10, wherein said characterization of said heat affected zone of said base metal material further comprises determining properties of said base metal material produced by said thermal-mechanical simulation.

12. The method of claim 11, wherein said properties of said heat affected zone of said base metal material produced by said thermal-mechanical simulation comprise a microstructure composition, a hardness, a toughness, a strength, a ductility, or a combination thereof, of said heat affected zone.

13. The method of claim 12, wherein said step of selecting said base metal material comprises comparing said properties of said base metal material produced by said thermal-mechanical simulation to said set of specified mechanical properties.

* * * * *